(12) United States Patent
Saxena

(10) Patent No.: US 10,687,206 B2
(45) Date of Patent: Jun. 16, 2020

(54) RESPONSE MESSAGES INCLUDING INFORMATION ELEMENTS NOT INDICATED AS REQUESTED

(71) Applicant: HEWLETT PACKARD ENTERPRISE DEVELOPMENT LP, Houston, TX (US)

(72) Inventor: Ravi Saxena, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 27 days.

(21) Appl. No.: 15/883,196

(22) Filed: Jan. 30, 2018

(65) Prior Publication Data

US 2019/0239063 A1      Aug. 1, 2019

(51) Int. Cl.
*H04W 8/20* (2009.01)
*H04L 29/06* (2006.01)
*H04W 8/04* (2009.01)

(52) U.S. Cl.
CPC ........... *H04W 8/20* (2013.01); *H04L 65/1016* (2013.01); *H04L 65/1063* (2013.01); *H04L 65/1073* (2013.01); *H04W 8/04* (2013.01)

(58) Field of Classification Search
CPC ...... H04W 8/20; H04W 8/04; H04L 65/1063; H04L 65/1016
See application file for complete search history.

(56) References Cited

U.S. PATENT DOCUMENTS

| 8,700,034 | B2   | 4/2014  | Cai |
| 9,021,014 | B2   | 4/2015  | Agarwal et al. |
| 9,154,641 | B2 * | 10/2015 | Shaw ................... H04W 4/029 |
| 9,596,621 | B2   | 3/2017  | Xu |
| 2007/0209061 | A1 | 9/2007 | Dekeyzer et al. |
| 2007/0280177 | A1 | 12/2007 | Uusikartano et al. |
| 2012/0052859 | A1 * | 3/2012 | Cai ................... H04L 29/12188 455/426.1 |
| 2012/0225679 | A1 * | 9/2012 | McCann ................. H04L 45/64 455/466 |

(Continued)

FOREIGN PATENT DOCUMENTS

WO    WO-2008104225 A1    9/2008

OTHER PUBLICATIONS

3GPP, 3rd Generation Partnership Project;Technical Specification Group Core Network and Terminals;IP Multimedia (IM) Subsystem Sh interface;Signalling flows and message contents (Release 13), 3GPP TS 29.328 V13.4.0, (Mar. 2016), pp. 1-73 (Year: 2016).*

(Continued)

*Primary Examiner* — Joe Chacko
(74) *Attorney, Agent, or Firm* — Trop, Pruner & Hu, P.C.

(57) ABSTRACT

In some examples, a system includes a storage to store a repository of user information, and a processor to receive, from a requester device, a request for a first information element relating to a user entity, and in response to a determination that the requester device supports a feature that enables the requester device to request multiple different information elements relating to the user entity in one request, send, in a response message that is responsive to the received request, the first information element and a second information element, the second information element not indicated as being requested by the received request.

20 Claims, 4 Drawing Sheets

(56) References Cited

U.S. PATENT DOCUMENTS

| | | | |
|---|---|---|---|
| 2013/0275583 A1* | 10/2013 | Roach | H04L 43/08 709/224 |
| 2014/0244551 A1* | 8/2014 | Aoki | G06N 20/00 706/12 |
| 2015/0036504 A1* | 2/2015 | McMurry | H04L 47/127 370/236 |
| 2017/0344910 A1* | 11/2017 | Wu | G06N 20/00 |

OTHER PUBLICATIONS

3GPP TS 29.328 V15.2.0, Technical Specification, 3rd Generation Partnership Project, Technical Specification Group Core Network and Terminals, IP Multimedia (IM) Subsystem Sh interface, Signaling flows and message contents (Release 15), Dec. 2017 (77 pages).

3GPP TS 29.329 V15.0.0, Technical Specification, 3rd Generation Partnership Project, Technical Specification Group Core Network and Terminals, Sh Interface based on the Diameter protocol, Protocol details (Release 15), Jun. 2017 (25 pages).

Fajardo et al., Internet Engineering Task Force (IETF), Request for Comments: 6733, Diameter Base Protocol, Oct. 2012 (152 pages).

IBM, IBM WebSphere IP Multimedia Subsystem Connector, Version 7.2, Introduction to the Sh subscriber profile web service and REST access downloaded Jan. 5, 2018 (3 pages) https://www.ibm.com/support/knowledgecenter/en/SS2P3U_7.2.0/com.ibm.diameter.intro.doc/sh_c.html.

LTE Encyclopedia, LTE Network Infrastructure and Elements downloaded Jan. 5, 2018 (6 pages) https://sites.google.com/site/lteencyclopedia/lte-network-infrastructure-and-elements.

R. Farahbakhsh et al., "Transmission Delay Reduction in IMS by Re-registration Procedure Modification," The Second International Conference on Next Generation Mobile Applications, Services, and Technologies, 2008, pp. 142-146, IEEE.

Wikipedia, Diameter (protocol) last edited on Oct. 23, 2017 (15 pages).

Wikipedia, IP Multimedia Subsystem lasted edited on Oct. 23, 2017 (16 pages).

* cited by examiner

RESPONSE MESSAGES INCLUDING INFORMATION ELEMENTS NOT INDICATED AS REQUESTED

BACKGROUND

Electronic devices are able to communicate over a network. Wireless devices communicate with a wireless network. A wireless network includes a mobile communications network (e.g., a cellular access network), a wireless local area network (WLAN), or another type of wireless network. Wired devices communicate with a wired network. A wired network includes an Ethernet network or another type of wired network.

BRIEF DESCRIPTION OF THE DRAWINGS

Some implementations of the present disclosure are described with respect to the following figures.

Figure 1:
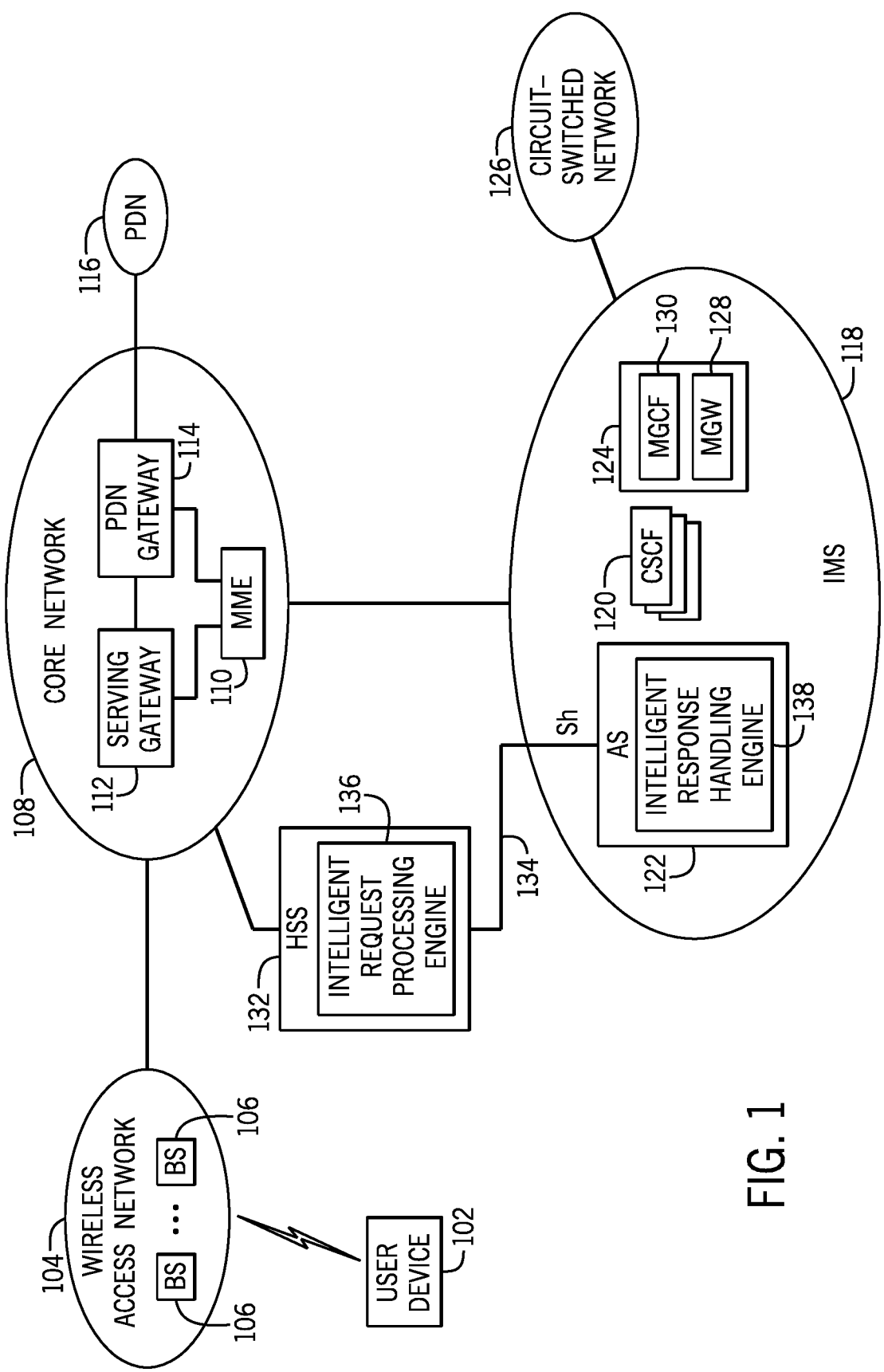
FIG. 1 is a block diagram of a network arrangement that includes an application server (AS), a home subscriber server (HSS), and an Internet Protocol (IP) Multimedia Core Network Subsystem (IMS), according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Electronic devices are able to perform various different types of communications over networks. The communications include voice communications (e.g., voice calls), data communications (e.g., web browsing sessions, email exchanges, online gaming sessions, music or video streaming sessions, etc.), or other types of communications. A network includes a wired network and/or a wireless network.

An Internet Protocol (IP) Multimedia Core Network Subsystem (IMS) provides an architectural framework for delivering IP multimedia services for communication sessions. A communication session may be established over a packet-switched network, such as an IP network that is implemented as a wired and/or a wireless network. In a packet-switched network, a dedicated circuit is not established through a network. Instead, in the packet-switched network, packets carry data exchanged between endpoints, and the packets share the communication resources of the network. Alternatively or additionally, a communication session is established over a circuit-switched network. In the circuit-switched network, a dedicated circuit is established between endpoints to carry data between the endpoints.

Supplementary services provided by the IMS include packet-switched voice call handling (e.g., handling of a voice-over-IP call), origination identification to identify an originating endpoint of a communication session, termination identification to identify a terminating endpoint of a communication session, communication diversion to divert a communication session from one endpoint to another endpoint, provision of a customized alert tone, a conference bridge service that establishes a bridge to connect multiple participants of a conference (e.g., a video conference, a voice conference, etc.), a voice call continuity service (in which call continuity can be maintained for an electronic device that moves between a packet-switched network and a circuit-switched network during a call), and so forth.

An IMS network architecture includes various network entities, including a home subscriber server (HSS), a call session and control function (CSCF), an application server (AS), and so forth. The network entities are used in establishing, maintaining, or tearing down communication sessions.

The AS is used to host and execute services (including any of the supplementary services listed above) on behalf of endpoints. An "endpoint" is an electronic device that participates in a communication session over a network. To provide a service on behalf of an endpoint, an AS obtains subscriber information associated with the endpoint. The subscriber information relates to a user entity. As used here, the "user entity" refers to any or a combination of: (1) an electronic device associated with a user and that is used for performing communications, and (2) the user.

The subscriber information is obtained from a subscriber information server. The subscriber information server may include an HSS. The HSS includes a home location register (HLR) and an authentication center (AuC). The HSS may further include other functions as well. The HLR stores and updates user subscription information. The user subscription information includes any or a combination of: a user identification or a user address, a user profile (including services that a user has subscribed to, a quality of service (QoS) to provide to the user, etc.), and so forth. The AuC generates security information based on user identity keys. The security information is used for performing authentication of the user entity and to secure (by encryption, for example) data transmitted over a network.

More generally, a subscriber information server includes any type of system, implemented with a computer or an arrangement of computers and associated data storage, that stores information relating to user entities.

An AS may send requests to a subscriber information server to seek certain information elements that are stored at or can be obtained by the subscriber information server. Generally, in some cases, to obtain multiple information elements, the AS may send corresponding multiple requests to the subscriber information server, which responds with corresponding multiple response messages.

Using multiple requests and corresponding multiple response messages to obtain information elements from the subscriber information server leads to an increased number of transactions and corresponding traffic between the AS and the subscriber information server. An increased number of requests and response messages consumes network bandwidth and impacts network capacity and response time. In another case, intermediary node(s) is (are) provided between the AS and the subscriber information server for network simplification. The load at the intermediary node(s) is increased if the intermediary node(s) handle(s) or process(es) multiple request-response message pairs between the AS and the subscriber information server.

Request and response messages are exchanged between an AS and a subscriber information server (e.g., an HSS) according to a specified protocol. For example, the specified protocol includes the Diameter protocol. Alternatively, the specified protocol includes a different protocol.

The Diameter protocol provides for messaging between network entities to support authentication, authorization, and accounting in a network. A version of the Diameter protocol is described in Request for Comments (RFC) 6733, entitled "Diameter Base Protocol," dated October 2012. An interface between an AS and an HSS that supports Diameter messaging is referred to as an Sh interface. The Sh interface is described by Third Generation Partnership Project (3GPP) specifications, including 3GPP Technical Specification (TS) 29.328 and 3GPP TS 29.329.

Although a specific interface between an AS and an HSS is discussed, it is noted that in other cases, other types of interfaces are used between AS's and subscriber information servers.

An Sh interface supports a "Notif-Eff" feature, as described in 3GPP TS 29.328 and 29.329. The Notif-Eff feature allows an AS to request, in a single request, multiple types of information elements. A request used by an AS over the Sh interface is referred to as an Sh-User-Data-Request (Sh-UDR). In an Sh-UDR sent by an application that supports the Notif-Eff feature, the Sh-UDR seeks multiple information elements by including respective multiple "Data References." "Data References" refer to requested information elements. An Sh-UDR includes a Data Reference Attribute-Value Pair (AVP), which refers to the information element requested by the Sh-UDR. In cases where the AS and the HSS both support the Notif-Eff feature, an Sh-UDR includes multiple Data Reference AVPs to request multiple information elements.

On the Sh interface, a response message that is responsive to an Sh-UDR is referred to as an Sh-User-Data-Answer (Sh-UDA). An Sh-UDA includes the information element(s) requested by an Sh-UDR.

Although Notif-Eff allows an AS to request multiple information elements in one request, it is noted that in some cases the AS does not include in one request all information elements sought by the AS. For example, the AS may avoid including a large number of Data References in one request if the HSS is unable to respond to the request for the multiple Data References in a reasonable amount of time (i.e., the HSS is expected to take too long to retrieve the requested information elements by querying a network). If the HSS takes too long to respond to the request from the AS, a timeout condition may occur at the AS that leads to the AS assuming that an error has occurred at the HSS.

Additionally, in some cases, until the AS receives a previously requested information element, the AS is unable to send a request for a different information element. For example, if the AS does not know yet the access domain (packet-switched domain or circuit-switched domain) of a communication session, the AS will not know what further information to request, since different further information elements are requested by the AS for different access domains. In other words, a subsequent request issued by the AS is reactive to a response of a previous request from the HSS.

As a result, even though the AS is able to support the Notif-Eff feature, the AS still sends multiple requests for certain information elements. Sending multiple requests leads to increased request-response traffic. Also, processing time at the AS is increased since the HSS sends responses just to requested information, and the AS sends further requests for desired additional information not previously provided by the HSS.

Examples of information elements include any or a combination of: Repository Data (data of the AS that is stored at the HSS), Mobile Station International Subscriber Directory Number (MSIDSN) (an identifier of a subscription in a mobile network), Terminating Access Domain Selection (T-ADS) information element (information to select a packet-switched or circuit-switched network for a communication session), Circuit-Switched Routing Number (CSRN) (a number identifying a target within a circuit-switched network to which a communication session is to be routed), Location Information (information that indicates a location of a subscriber in a domain), etc.

In accordance with an implementation of the present disclosure, an intelligent subscriber information server (such as an intelligent HSS) proactively includes an additional information element in a response message even though the additional information element may not have been indicated as requested in a request sent by the AS to the subscriber information server. Including an additional information element in a response message refers to including a single additional information element in the response message or including multiple information elements in the response message.

More specifically, a request sent by the AS to the subscriber information server identifies a number of information elements that are requested. The number of information elements requested includes one information element or multiple information elements. For the Sh interface between an AS and an HSS, the requested information element(s) is (are) identified by corresponding Data Reference AVP(s). The intelligent subscriber information server may respond to the request from the AS with a response message that includes the requested information element(s), as identified by the request, as well as additional information element(s) not identified by the request.

FIG. 1 shows an example communications arrangement in which a user device 102 establishes a communication session with another endpoint through a wireless access network 104 and a core network 106. In FIG. 1, the user device 102 is a wireless device. In a different example, the user device 102 is a wired user device that is connected to a wireless network to establish a communication session with another endpoint.

Examples of user devices include a notebook computer, a desktop computer, a mobile telephone, a smartphone, a personal digital assistant, a tablet computer, a game appliance, a wearable device (e.g., a smart watch, smart eyeglasses, a head-mounted device, etc.), or any other electronic device.

The user device 102 establishes a wireless connection with a base station 106 in the wireless access network 104. Each of multiple base stations 106 in the wireless access network 104 has respective coverage area. The user device 102 establishes a wireless connection with a given base station 106 when the user device 102 is in the coverage area of the given base station 106.

The wireless access network 104 may operate according to the Long Term Evolution (LTE) standards, as established by 3GPP. In other cases, the wireless access network 104 operates according to other protocols, including Fifth Generation (5G) protocols, the Wi-Fi protocol (as established by the Institute of Electrical and Electronic Engineers (IEEE) 802.11 standards), and so forth.

In the ensuing discussion, reference is made to examples in which LTE is used for communications. In other examples, the techniques or systems described are applicable for use with other communication protocols.

In the wireless access network 104 that operates according to the LTE standards, the base stations 106 are referred to as evolved NodeBs (eNodeBs). The wireless network 104 is coupled to the core network 108 that includes various core network nodes. According to LTE, the core network nodes include a mobility management entity (MME) 110, a serving gateway (SGW) 112, and a packet data network (PDN) gateway (PGW) 114.

A "node" refers to a computing system, a portion of a computing system, a collection of computing systems, or machine-readable instructions.

The MME 110 is part of a control plane and handles control signaling related to communication sessions, such as for a communication session established for the user device 102. The SGW 112 and the PGW 114 are part of a user plane and handle data traffic between endpoints that are involved in a communication session. If the user device 102 is involved in a communication session with another endpoint coupled to a PDN 116 (e.g., the Internet or other type of network), the data traffic of the communication session is routed by the SGW 112 and PGW 114 to the PDN 116. The PDN 116 is a packet-switched network.

Alternatively, the user device 102 may establish a communication session with another endpoint that is wirelessly connected to the wireless access network 104, or another endpoint that is coupled to a circuit-switched network 126.

FIG. 1 further shows an IMS 118 that includes various nodes. The nodes of the IMS 118 include CSCFs 120. A CSCF is used to process control signaling for an endpoint (e.g., the user device 102) that is accessing an IMS supplementary service. Examples of different CSCFs 120 include a proxy CSCF (P-CSCF), an interrogating CSCF (I-CSCF), and a serving CSCF (S-CSCF).

The nodes of the IMS 118 further include an AS 122. In addition, the nodes of the IMS 118 additionally include circuit-switched gateway nodes 124 that allow for communication session (or a part of a communication session) to be established over the circuit-switched network 126. The circuit-switched gateway nodes of the IMS 118 include a media gateway (MGW) 128 and a media gateway control function (MGCF) 130. The MGW 128 converts between traffic in a packet-switched format (e.g., an IP packet) and data in a circuit-switched format for communication over the circuit-switched network 126. The MGCF 130 handles control signaling used to establish a communication session (or a part of the communication session) over the circuit-switched network 126.

The network arrangement of FIG. 1 also includes an HSS 132. As shown in FIG. 1, the AS 122 in the IMS 118 is coupled to the HSS 132 over an Sh interface 134.

The HSS 132 includes an intelligent request processing engine 136 according to an implementation of the present disclosure. The AS 122 includes an intelligent response handling engine 138.

An "engine" refers to a hardware processing circuit. A hardware processing circuit includes any or a combination of: a microprocessor, a core of a multi-core microprocessor, a microcontroller, a programmable integrated circuit device, a programmable gate array, or any other type of hardware processing circuit. Alternatively, an "engine" refers to a combination of a hardware processing circuit in machine-readable instructions executable on the hardware processing circuit.

The intelligent request processing engine 136 of the HSS 132 proactively includes additional information element(s) in a response message even though the additional information element(s) is (are) not indicated as requested by the AS 122.

The intelligent response handling engine 138 of the AS 122 processes a response message that includes the additional information element(s) that was not requested by the AS 122. In this way, the AS 122 is able to receive a response message including non-requested information element(s), and does not discard the response message as erroneous for including non-requested information element(s).

Figure 2:
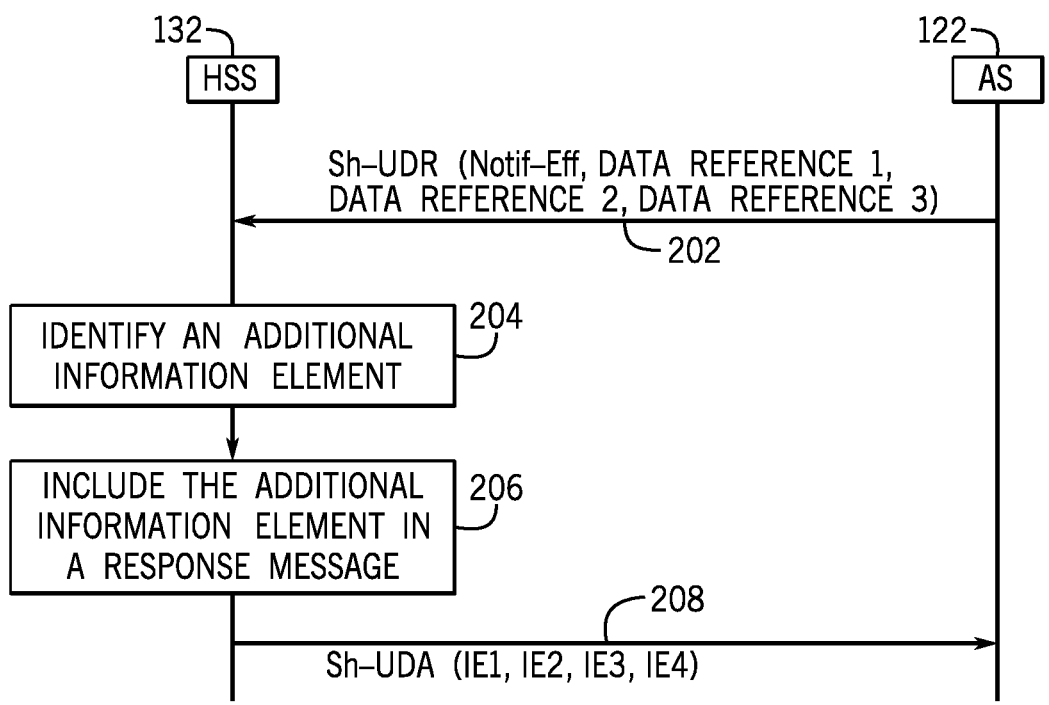
FIG. 2 is a message flow diagram of a process according to some examples.

FIG. 2 is a flow diagram of a process performed by the AS 122 and the HSS 132. The AS 122 sends (at 202) a request, e.g., an Sh-UDR, to the HSS 132. The Sh-UDR message contains an indicator referred to as Notif-Eff, which when set to a first value indicates that the AS 122 supports the Notif-Eff feature that allows the AS 122 to request multiple types of information elements in one request, e.g., the Sh-UDR. The Notif-Eff indicator when not set to the first value indicates that the AS does not support the Notif-Eff feature.

In the example of FIG. 2, the multiple information elements that are requested by the Sh-UDR include information elements referred to by Data Reference 1, Data Reference 2, and Data Reference 3. In a specific example, Data Reference 1 refers to a Repository Data information element, Data Reference 2 refers to an MSISDN information element, and Data Reference 3 refers to a T-ADS information element. The Sh-UDR can include Data References for other information elements in other examples.

Assuming that the HSS 132 also supports the Notif-Eff feature, the HSS 132 identifies (at 204), in response to detecting the Notif-Eff indicator set to the first value, an additional information element to include in an intelligent response. Identifying an additional information element to include in an intelligent response refers to identifying a single additional information element or identifying multiple additional information elements.

To identify the additional information element, the HSS 132 analyzes a compiled result retrieved in response to the Sh-UDR message. Based on this analysis, the HSS 132, and more specifically, the intelligent request processing engine 136 of the HSS 132, collects additional information for inclusion in a response back to the AS 122, so the AS 122 does not send further request(s) for the additional information.

The analysis of the compiled result in response to the request may be based on a configuration rule (or a collection of configuration rules). A configuration rule specifies that if a specified condition is present (as indicated by the complied result retrieved in response to the Sh-UDR message), then the AS is likely to request a certain additional information element. For example, if the compiled result indicates that a communication session of the user device 102 is in the circuit-switched domain (e.g., as indicated by the T-ADS information element), then the intelligent request processing engine 136 of the HSS 132 obtains the CSRN and Location Information elements as additional information elements for inclusion in an intelligent response.

The intelligent request processing engine 136 of the HSS 132 includes (at 206) the identified additional information element in a response message. Including an additional information element in a response message refers to including a single additional information element in the response message or including multiple additional information elements in the response message.

The HSS 132 sends (at 208) the response message, e.g., an Sh-UDA, that contains the intelligent response. The intelligent response includes information elements (IE1, IE2, and IE3) requested by the Sh-UDR, and the additional information element (IE4) identified by the intelligent request processing engine 136 of the HSS 132.

IE1 is referred to by Data Reference 1, IE2 is referred to by Data Reference 2, IE3 is referred to by Data Reference 3, and IE4 is not indicated as requested by the Sh-UDR.

Figure 3:
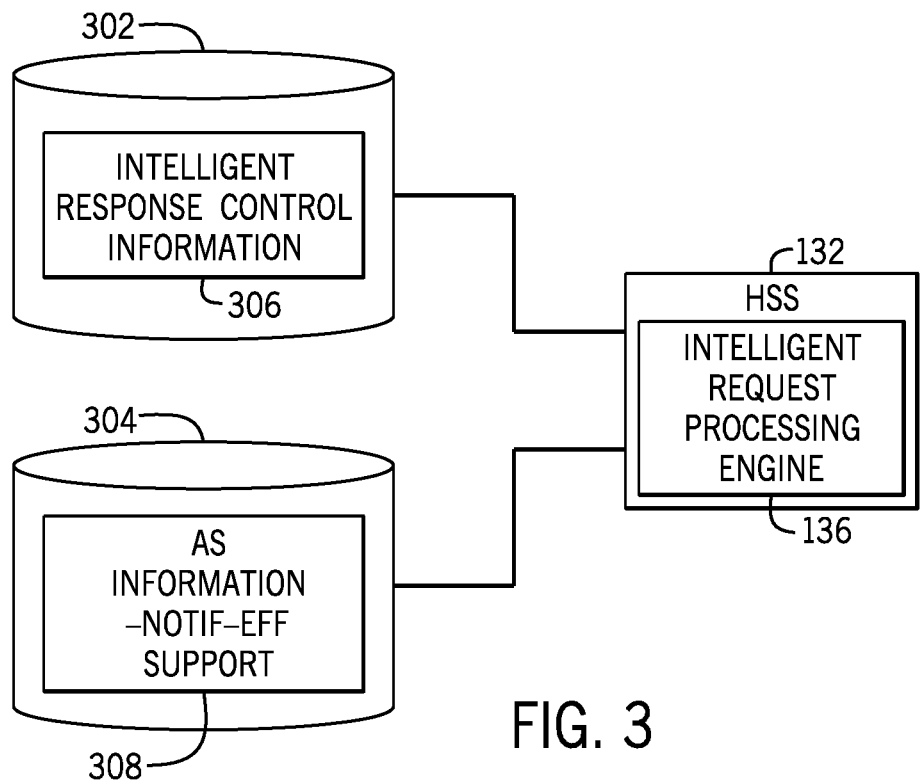
FIG. 3 is a block diagram of an arrangement including an HSS and information repositories, in accordance with further examples.

FIG. 3 is a block diagram of an arrangement including the HSS 132 and information repositories 302 and 304. Each information repository 302 or 304 is implemented using a storage. The storage is a physical storage or a virtual storage. If a physical storage, the storage includes a physical storage device or multiple physical storage devices. Examples of physical storage devices include memory devices, disk-based storage devices, and so forth.

The information repository 302 contains intelligent response control information 306. The intelligent request processing engine 136 of the HSS 132 uses the intelligent response control information 306 to determine any additional information elements to include in a response message in addition to information element(s) requested by the AS 122. For example, the intelligent response control information 306 includes a configuration rule or a collection of configuration rules that specifies that certain additional information element(s) is (are) to be included in a response message if a compiled result for a request indicates a specified condition.

The information repository 304 includes AS information 308 pertaining to an AS, or to multiple AS's. The AS information 308 can indicate whether a specific AS supports the Notif-Eff feature. The intelligent request processing engine 136 adds, for a given AS, the AS information 308 indicating support for the Notif-Eff feature in response to the given AS previously indicating that the given AS supports the Notif-Eff feature (e.g., the given AS sets the Notif-Eff indicator to the first value in a previous Sh-UDR). In this manner, the intelligent request processing engine 136 of the HSS 132 learns that an AS supports the Notif-Eff feature based on a past behavior of the AS.

If the intelligent request processing engine 136 receives, from the a particular AS, a new Sh-UDR that does not include the Notif-Eff indicator or that has the Notif-Eff indicator not set, the intelligent request processing engine 136 nevertheless can provide an intelligent response if the intelligent request processing engine 136 determines based on the AS information 308 that the particular AS 122 supports the Notif-Eff feature.

Figure 4:
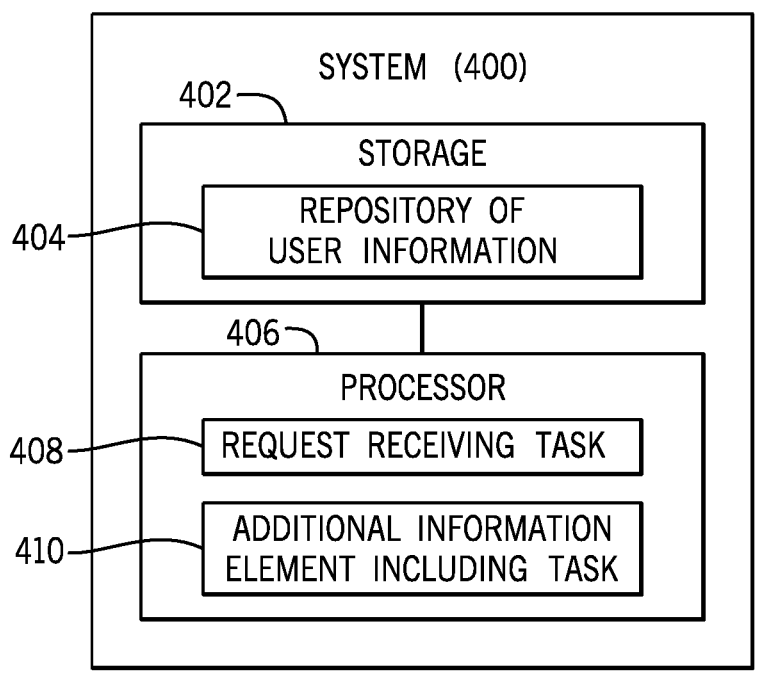
FIG. 4 is a block diagram of a system according to additional examples.

FIG. 4 is a block diagram of a system 400 including a storage 402 to store a repository 404 of user information. The system 400 further includes a processor 406 to perform various tasks. A processor to perform a task refers to a single processor to perform the task or multiple processors to perform the task. A processor can include a microprocessor, a core of a multi-core microprocessor, a microcontroller, a programmable integrated circuit, a programmable gate array, or another hardware processing circuit.

The tasks performed by the processor 406 include a request receiving task 408 to receive, from a requester device, a request for a first information element relating to a user entity. The tasks further include an additional information element including task 410 to, in response to a determination that the requester device supports a feature that enables the requester device to request multiple different information elements relating to the user entity in one request, send, in a response message that is responsive to the received request, the first information element and a second information element, the second information element not indicated as being requested by the received request.

Figure 5:
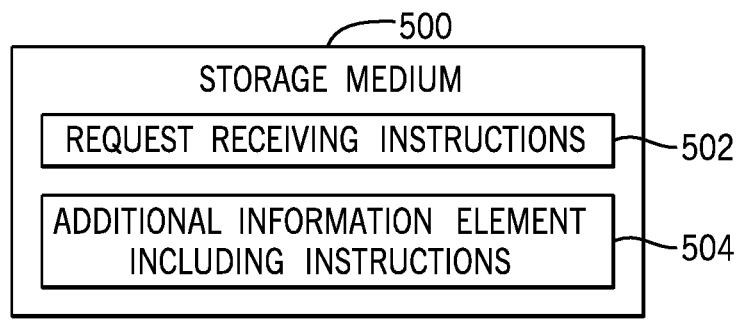
FIG. 5 is a block diagram of storage medium storing machine-readable instructions according to further examples.

FIG. 5 is a block diagram of a non-transitory machine-readable or computer-readable storage medium 500 storing machine-readable instructions that upon execution cause a subscriber information server to perform various tasks. The machine-readable instructions include request receiving instructions 502 to receive, from an application server, a request for a first information element relating to a user entity. The machine-readable instructions further include additional information element including instructions 504 to, in response to a determination that the application server supports a feature that enables the application server to request multiple different information elements relating to the user entity in one request, send, in a response message that is responsive to the received request, the first information element and a second information element, the second information element not indicated as being requested by the received request.

Figure 6:
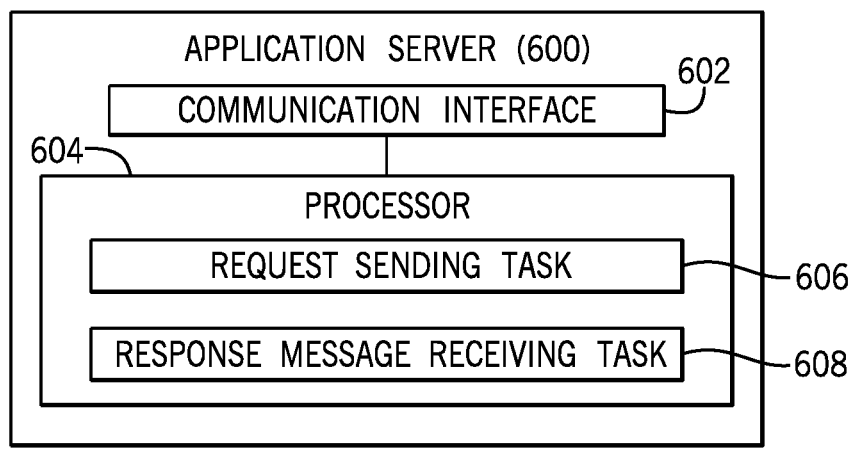
FIG. 6 is a block diagram of an AS according to alternative examples.

FIG. 6 is a block diagram of an application server 600 that includes a communication interface 602 to communicate with a subscriber information server that stores information relating to user entities. The application server 600 further includes a processor 604 to perform various tasks.

The tasks include a request sending task 606 to send a request to the subscriber information server, the request seeking a first information element. The tasks further include a response message receiving task 608 to receive a response message that is responsive to the request, the response message including the first information element and a second information element not indicated as being requested by the request, where the second information element is included in the response message by the subscriber information server based on a determination by the subscriber information server that the application server supports a feature that enables the application server to request multiple different information elements relating to the user entity in one request.

The storage medium 500 of FIG. 5 includes include any or a combination of: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture refers to any manufactured single component or multiple components. The storage medium or media may be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
a storage to store a repository of user information; and
a processor configured to:
receive, from a requester device, an Sh-User-Data-Request for a first data reference relating to a user entity, wherein the Sh-User-Data-Request identifies the first data reference in accordance with accessible values via a Sh interface, wherein the accessible values are based on application server (AS) permission rights defined by a standard,
determine that the requester device supports a feature that enables the requester device to request multiple different data references relating to the user entity in one Sh-User-Data-Request,
determine unrequested data references in accordance with the accessible values via the Sh interface, wherein the unrequested data references include a remaining set of accessible values less the first data reference included in the Sh-User-Data-Request and the unrequested data references are not directly related to the first data reference, and
send, in a single Sh-User-Data-Answer that is responsive to the received Sh-User-Data-Request, the first data reference and the unrequested data references, the unrequested data references not indicated as being requested and not directly related to the first data reference by the received Sh-User-Data-Request.

2. The system of claim 1, wherein the processor is further configured to:
identify an additional data reference based on a condition indicated by a result obtained in response to the Sh-User-Data-Request.

3. The system of claim 1, wherein the system comprises a home subscriber server.

4. The system of claim 1, wherein the requester device comprises an application server.

5. The system of claim 1, wherein the user entity comprises a user device connected to a communications network.

6. The system of claim 1, wherein the determination that the requester device supports the feature that enables the requester device to request multiple different data references relating to the user entity in one Sh-User-Data-Request is based on a value of an indicator included in the received Sh-User-Data-Request.

7. The system of claim 6, wherein the received Sh-User-Data-Request comprises a Diameter Sh-User-Data-Request, and the indicator comprises a Notif-Eff indicator in the Sh-User-Data-Request.

8. The system of claim 7, wherein the Sh-User-Data-Answer comprises a Diameter Sh-User-Data-Answer (Sh-UDA).

9. The system of claim 1, wherein the determination that the requester device supports the feature that enables the requester device to request multiple different data references relating to the user entity in one Sh-User-Data-Request is based on information relating to a past behavior of the requester device.

10. The system of claim 1, wherein the determination that the requester device supports the feature that enables the requester device to request multiple different data references relating to the user entity in one Sh-User-Data-Request is based on accessing a data repository that includes information for a plurality of requester devices, the information for the plurality of requester devices indicating whether or not each respective requester device of the plurality of requester devices supports the feature that enables the respective requester device to request multiple different data references relating to the user entity in one Sh-User-Data-Request.

11. The system of claim 1, wherein the processor is to:
in response to a determination that the requester device likely will request a second data reference at a later time based on a result for the first data reference requested in the received Sh-User-Data-Request, obtain the second data reference and include the second data reference response in the Sh-User-Data-Answer.

12. The system of claim 11, wherein the first data reference requested in the received Sh-User-Data-Request relates to a type of access domain used by the user entity for a communication session, and determining that the requester device likely will request the second data reference at the later time is based on the type of the access domain.

13. A non-transitory machine-readable storage medium storing instructions that upon execution cause a subscriber information server to:
receive, from an application server, an Sh-User-Data-Request for a first data reference relating to a user entity, wherein the Sh-User-Data-Request identifies the first data reference in accordance with accessible values via a Sh interface, wherein the accessible values are based on application server (AS) permission rights defined by a standard;
determine that the requester device supports a feature that enables the requester device to request multiple different data references relating to the user entity in one Sh-User-Data-Request;
determine unrequested data references in accordance with the accessible values via the Sh interface, wherein the unrequested data references include a remaining set of accessible values less the first data reference included in the Sh-User-Data-Request and the unrequested data references are not directly related to the first data reference; and
send, in a single Sh-User-Data-Answer that is responsive to the received Sh-User-Data-Request, the first data reference and the unrequested data references, the unrequested data references not indicated as being requested and not directly related to the first data reference by the received Sh-User-Data-Request.

14. The non-transitory machine-readable storage medium of claim 13, wherein the received Sh-User-Data-Request is for a plurality of data references including the first data reference but not the unrequested data references.

15. The non-transitory machine-readable storage medium of claim 13, wherein the instructions upon execution cause the subscriber information server to:
compile a result for the first data reference requested by the received Sh-User-Data-Request; and
include the unrequested data references in the Sh-User-Data-Answer in response to a determination based on the compiled result that the application server is likely to request the data references at a later time.

16. The non-transitory machine-readable storage medium of claim 15, wherein the instructions upon execution cause the subscriber information server to:

determine that the application server is likely to request the data references at the later time based on the compiled result indicating that the user entity connects to the network using a specified type of an access domain for a communication session of the user entity.

17. The non-transitory machine-readable storage medium of claim 16, wherein the specified type of access domain is a circuit-switched domain.

18. An application server comprising:

a communication interface to communicate with a subscriber information server that stores information relating to user entities; and a processor configured to:

send an Sh-User-Data-Request to the subscriber information server, the Sh-User-Data-Request seeking a first data reference, wherein the Sh-User-Data-Request identifies the first data reference in accordance with accessible values via a Sh interface, wherein the accessible values are based on application server (AS) permission rights defined by a standard, and upon a determination that the requester device supports a feature that enables the requester device to request multiple different data references relating to the user entity in one Sh-User-Data-Request, receive a single Sh-User-Data-Answer that is responsive to the Sh-User-Data-Request, the response message including the first data reference and Data the unrequested data references not indicated as being requested by the Sh-User-Data-Request.

19. The application server of claim 18, wherein the Sh-User-Data-Request comprises an indicator set to a value indicating that the application server supports the feature that enables the application server to request multiple different data references relating to the user entity in one Sh-User-Data-Request.

20. The application server of claim 19, wherein the indicator comprises a Notif-Eff indicator in the Sh-User-Data-Request.

\* \* \* \* \*